(12) United States Patent
Pydin

(10) Patent No.: US 10,495,208 B2
(45) Date of Patent: Dec. 3, 2019

(54) VEHICLE DRIVE APPARATUS

(71) Applicant: Honda Motor Co., Ltd., Tokyo (JP)

(72) Inventor: Andrii Pydin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/101,170

(22) Filed: Aug. 10, 2018

(65) Prior Publication Data

US 2019/0063590 A1   Feb. 28, 2019

(30) Foreign Application Priority Data

Aug. 29, 2017   (JP) .................... 2017-164385

(51) Int. Cl.
| | | |
|---|---|---|
| *F16H 57/04* | (2010.01) | |
| *F16H 37/04* | (2006.01) | |
| *F16H 57/021* | (2012.01) | |
| *F16H 57/038* | (2012.01) | |
| *F16H 57/02* | (2012.01) | |

(52) U.S. Cl.
CPC ....... *F16H 57/0486* (2013.01); *F16H 37/041* (2013.01); *F16H 57/021* (2013.01); *F16H 57/038* (2013.01); *F16H 57/043* (2013.01); *F16H 57/0404* (2013.01); *F16H 57/045* (2013.01); *F16H 57/0424* (2013.01); *F16H 57/0476* (2013.01); *F16H 2057/02026* (2013.01); *F16H 2057/02034* (2013.01)

(58) Field of Classification Search
CPC .. F16H 57/0424; F16H 57/043; F16H 57/045; F16H 57/0453; F16H 57/0482; F16H 57/0484; F16H 57/0486
See application file for complete search history.

(56) References Cited

U.S. PATENT DOCUMENTS 8,905,885 B2 * 12/2014 Yamamoto ............ B60K 6/405
                                                              180/65.235

FOREIGN PATENT DOCUMENTS

JP           2007205499 A        8/2007

* cited by examiner

*Primary Examiner* — Erin D Bishop
(74) *Attorney, Agent, or Firm* — Duft & Bornsen, PC

(57) ABSTRACT

A vehicle drive apparatus including a case member having a bottom wall portion and a side wall portion to form a reservoir space of oil which includes a first reservoir space radially inward of a shaft support member, a second reservoir space between the shaft support member and a ring gear, and a third reservoir space radially outward of the ring gear, a first passage provided in the shaft support member to communicate the first reservoir space and the second reservoir space, a second passage provided in the ring gear to communicate the second reservoir space and the third reservoir space, and an oil passage forming part configured to form an oil passage to communicate with the first reservoir space at a first end of the oil passage and communicate with an oil pump at a second end of the oil passage.

10 Claims, 13 Drawing Sheets

VEHICLE DRIVE APPARATUS

CROSS-REFERENCE TO RELATED APPLICATION

This application is based upon and claims the benefit of priority from Japanese Patent Application No. 2017-164385 filed on Aug. 29, 2017, the content of which is incorporated herein by reference.

BACKGROUND OF THE INVENTION

Field of the Invention

This invention relates to a vehicle drive apparatus.

Description of the Related Art

Conventionally, there is a known apparatus for preventing occurrence of aeration when a pump sucks in oil accumulated at the bottom of a transmission. In the apparatuses of this type described in Japanese Unexamined Patent Publication No. 2007-205499 (JP2007-205499A), a strainer centered on a vertical axis is installed to be rotatable fully around the inside of an oil pan. Therefore, when a force arising during vehicle acceleration, turning or the like shifts the oil level in the oil pan, the strainer rotates in the direction of the shift to prevent suction of air through an oil intake port at the end of the strainer.

However, since the apparatus taught by JP2007-205499A requires a space for rotating the strainer at the bottom of the transmission, it increases height of the transmission by the height of this space.

SUMMARY OF THE INVENTION

An aspect of the present invention is a vehicle drive apparatus including: a rotating shaft extending along an axial line in a vertical direction; a planetary gear mechanism arranged around the rotating shaft about the axial line so as to enable transmission of a torque to the rotating shaft; a case member configured to accommodate the rotating shaft and the planetary gear mechanism, the case member including a bottom wall portion and a side wall portion to form a reservoir space for accumulating an oil supplied from an oil pump; a shaft support member formed cylindrically and projected upward from an upper surface of the bottom wall portion to support rotatably the rotating shaft, the planetary gear mechanism including a ring gear arranged around the shaft support member so as to surround the shaft support member, the ring gear including a bottom portion fixed to the upper surface of the bottom wall portion, the reservoir space including a first reservoir space radially inward of the shaft support member, a second reservoir space between the shaft support member and the ring gear, and a third reservoir space radially outward of the ring gear; a first passage provided in the shaft support member to communicate the first reservoir space and the second reservoir space; a second passage provided in the ring gear to communicate the second reservoir space and the third reservoir space; and an oil passage forming part configured to form an oil passage to communicate with the first reservoir space at a first end of the oil passage and communicate with the oil pump at a second end of the oil passage.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
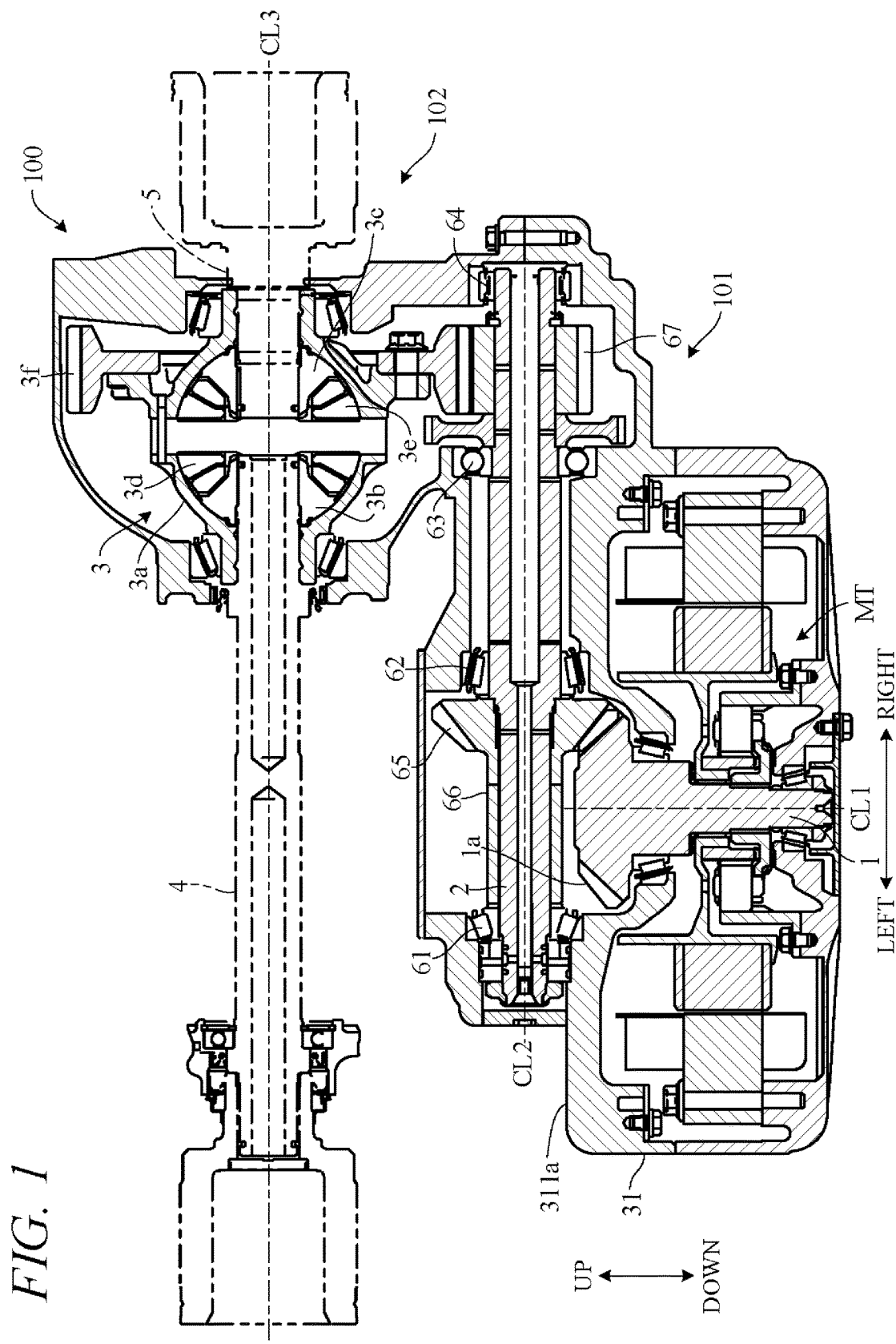
FIG. 1 is a cross-sectional diagram showing a developed view of main components of a vehicle drive apparatus according to an embodiment of the present invention.

Hereinafter, an embodiment of the present invention is explained with reference to FIGS. 1 to 11. FIG. 1 is a cross-sectional diagram showing a developed view of main components of a vehicle drive apparatus 100 according to the embodiment of the present invention. The vehicle drive apparatus 100 includes an electric motor MT as an example of a dynamoelectric machine and is configured to output torque from the electric motor MT to driving wheels of a vehicle. Therefore, the vehicle drive apparatus 100 is mounted on an electric vehicle, hybrid vehicle or other vehicle having the electric motor MT as a drive (propulsion) power source. The electric motor MT is also used as a generator. In FIG. 1, under a condition that the vehicle drive apparatus 100 is mounted on the vehicle, vehicle vertical (height) direction, i.e., up-down direction and lateral (width) direction, i.e., left-right direction are indicated by arrows.

As shown in FIG. 1, the vehicle drive apparatus (vehicle drive unit) 100 includes a first drive unit 101 for converting and outputting torque of the motor MT as torque centered on a lateral axis CL2 and a second drive unit 102 for converting and outputting torque output from the first drive unit 101 as torque centered on a lateral axis CL3. Although the second drive unit 102 appears above the first drive unit 101 in the developed view of FIG. 1, the second drive unit 102 is actually situated forward or rearward of the first drive unit 101, and axis CL3 is located below axis CL2 (see FIGS. 4A and 4B).

As shown in FIG. 1, the vehicle drive apparatus includes the motor MT, a first shaft 1 rotatably supported centered on a vertical axis CL1 extending in up-down direction inside the motor MT, a second shaft 2 rotatably supported centered on the axis CL2 orthogonal to the axis CL1, and a differential 3 rotatably supported centered on the axis CL3 parallel to the axis CL2. Torque from the motor MT is transmitted through the first shaft 1, second shaft 2 and differential 3 to left and right drive shafts 4 and 5, whereby left and right drive wheels are driven.

Figure 2:
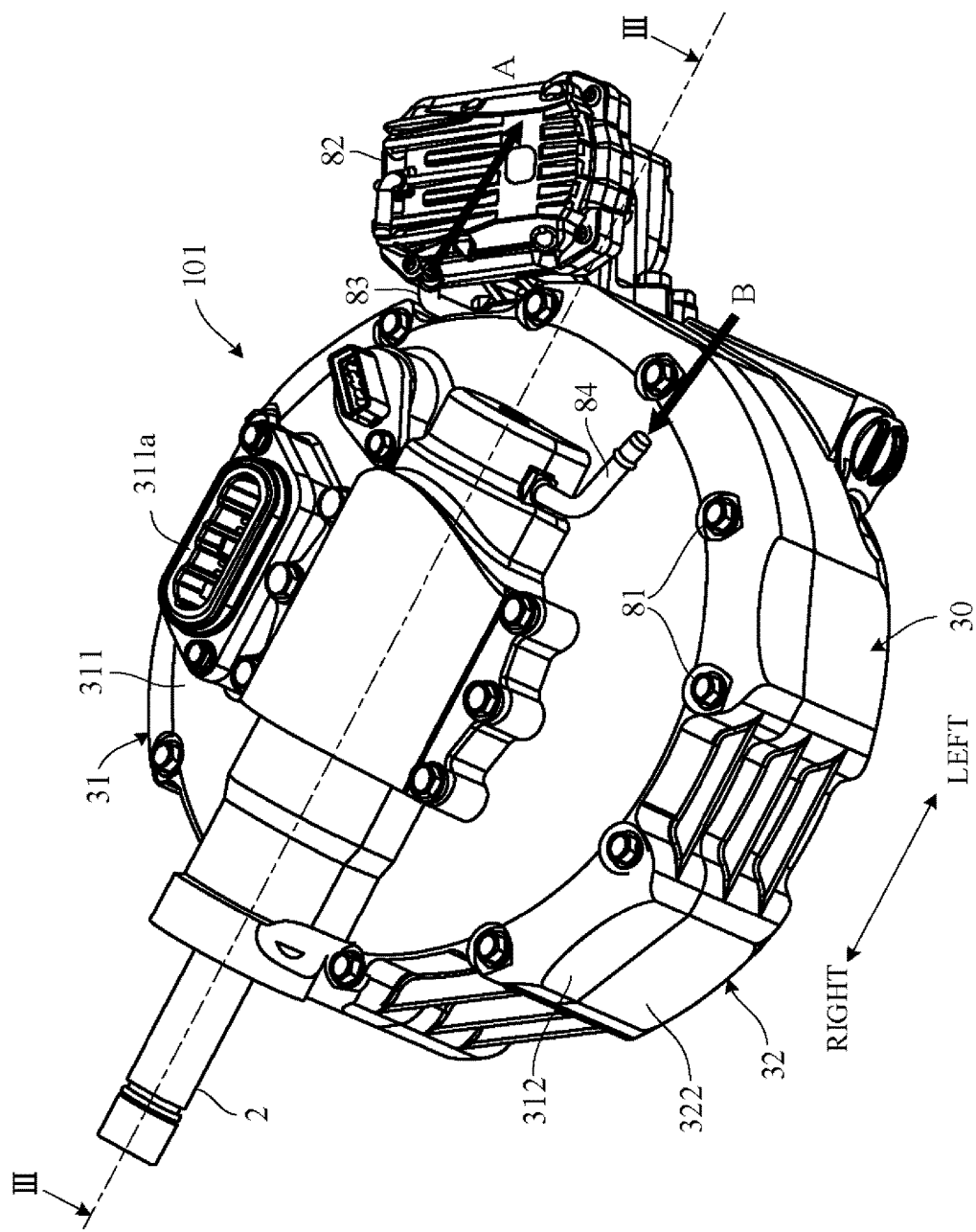
FIG. 2 is a perspective view showing an appearance of main parts of the vehicle drive apparatus of FIG. 1.
Figure 3:
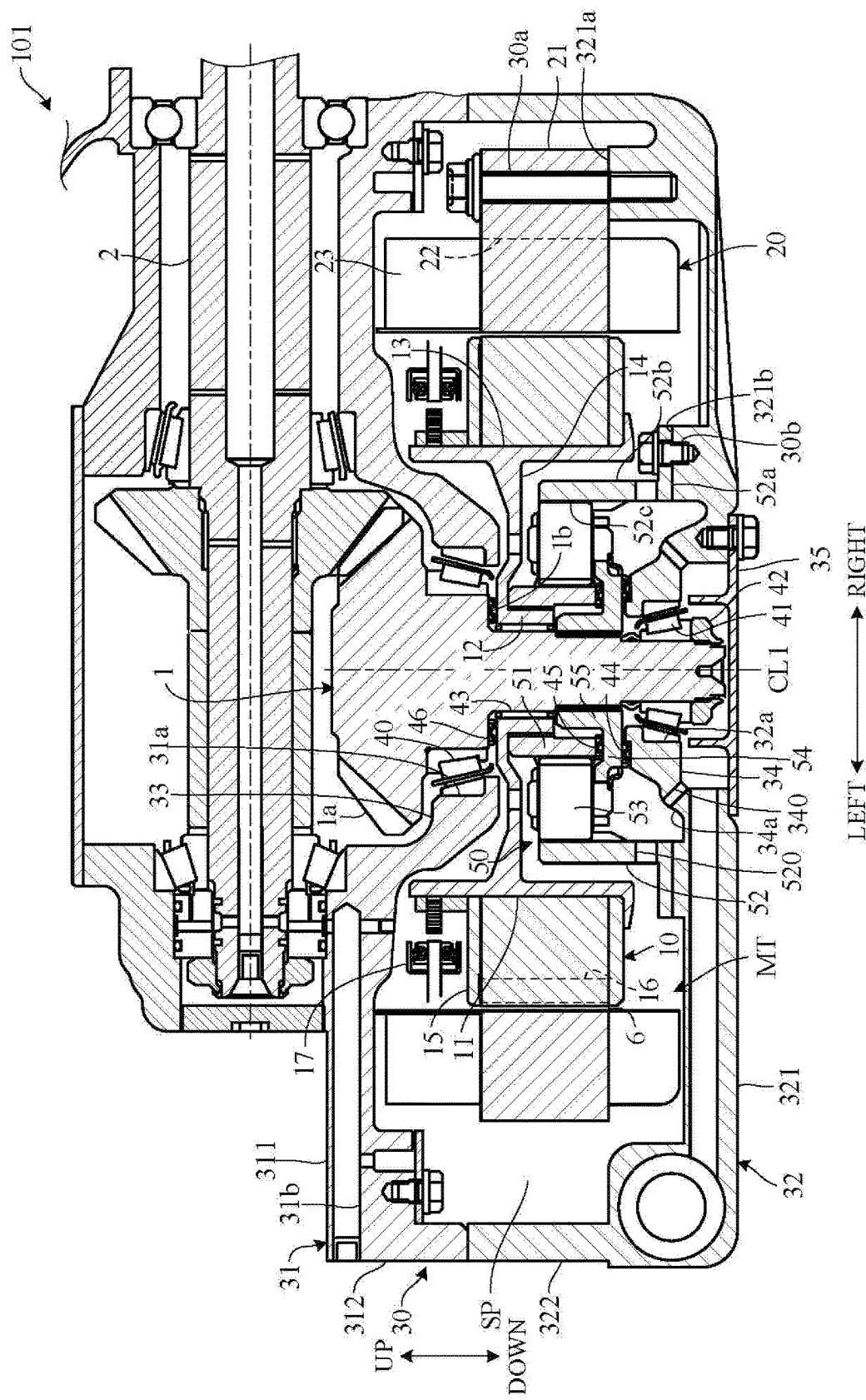
FIG. 3 is a cross-sectional diagram taken along line of FIG. 2.

FIG. 2 is a perspective view showing an appearance of the first drive unit 101 of FIG. 1 as viewed obliquely from above. FIG. 3 is an enlarged cross-sectional diagram of main parts of the first drive unit 101 of FIG. 1 (cross-sectional diagram taken along line of FIG. 2), and is the cross-sectional diagram of a position (portion) different from that of FIG. 1.

As shown in FIG. 3, the motor MT includes a rotor 10 which rotates centered on the axis CL1 and a stator 20 arranged around the rotor 10. The rotor 10 and stator 20 are accommodated in a housing space SP inside a case 30.

The rotor 10 includes a rotor hub 11 and a rotor core 15. The rotor hub 11 includes a substantially cylinder-shaped shaft portion 12 centered on the axis CL1, a cylindrical portion 13 of larger diameter than and coaxial with the shaft portion 12, and a substantially disk-shaped plate portion 14 which extends radially to connect the shaft portion 12 and cylindrical portion 13. The rotor core 15 is a substantially cylinder-shaped rotor iron core centered on the axis CL1. The rotor core 15 is fitted on and fastened to an outer peripheral surface of the cylindrical portion 13 of the rotor hub 11 so as to rotate integrally with the rotor hub 11. The motor MT is an interior permanent magnet synchronous motor, and multiple circumferentially spaced permanent magnets 16 are embedded in the rotor core 15. A sensor 17 for detecting a rotational position (rotational angle) of the rotor 10 is provided above the rotor core 15. Alternatively, it is possible instead to use as the motor MT one having no magnets 16, such as a synchronous reluctance motor or switched reluctance motor.

The stator 20 has a substantially cylinder-shaped stator core 21 which is centered on the axis CL1 and disposed across a gap 6 of predetermined radial length from an outer peripheral surface of the rotor core 15. The stator core 21 is a fixed iron core whose inner peripheral surface is formed with multiple circumferentially spaced and radially outward directed slots 22. A winding 23 (coil) is formed in the slots 22 as a concentrated winding or distributed winding. Upper and lower ends of the winding 23 protrude upward and downward of upper and lower ends of the stator core 21. The rotor 10 rotates when a revolving magnetic field is generated by passing three-phase alternating current through the winding 23.

As shown in FIGS. 2 and 3, the case 30 includes an upper case 31 and a lower case 32 which are vertically separable. The upper case 31 has a substantially circular top wall 311 and a substantially cylindrical side wall 312 extending downward from a peripheral portion of the top wall 311. A connector 311a is provided on an upper surface of the top wall 311, and electric current is supplied through the connector 311a to the winding 23 below the top wall 311. The lower case 32 has a substantially circular bottom wall 321 and a substantially cylindrical side wall 322 extending upward from a peripheral portion of the bottom wall 321. As shown in FIG. 2, the upper case 31 and lower case 32 are joined by multiple peripheral bolts 81 passing downward through the upper case 31 and screwed into the lower case 32.

As shown in FIG. 3, flanges 321a are provided on an upper surface of the bottom wall 321, and the stator core 21 is fastened to the flanges 321a by through-bolts 30a. Substantially circular openings 31a and 32a centered on the axis CL1 are formed at a middle region of the upper case 31 and a middle region of the lower case 32, respectively. A shaft support 33 formed in a substantially truncated cone shape is provided in the opening 31a of the upper case 31 to extend downward and radially inward. A shaft support 34 formed in a substantially truncated cone shape is provided in the opening 32a of the lower case 32 to extend upward and radially inward.

Outer peripheral surfaces of the first shaft 1 are respectively rotatably supported by the shaft supports 33 and 34 via taper roller bearings 40 and 41. The first shaft 1 is restrained in axial direction by a nut 42 fastened to its lower end portion. A plate-like cover 35 is attached to a lower surface of the bottom wall 321 from outside so as to close the opening 32a. The cover 35 is attached to a flange formed like a recess on the lower surface of the bottom wall 321 so that a lower surface of the cover 35 and the lower surface of the bottom wall 321 are located in about the same plane. An inner peripheral surface of the shaft portion 12 of the rotor hub 11 is supported on the outer peripheral surface of the first shaft 1 via a needle bearing 43 in a manner rotatable relative to the first shaft 1.

A planetary gear mechanism 50 is interposed in a torque transmission path between the rotor 10 and the first shaft 1. The planetary gear mechanism 50 includes a sun gear 51 and a ring gear 52, both of substantially cylinder shape centered on the axis CL1, multiple circumferentially spaced planetary gears 53 disposed between the sun gear 51 and the ring gear 52, and a substantially cylinder shaped carrier 54 placed below the planetary gears 53 ratatably centered on the axis CL1 to rotatably support the planetary gears 53. A needle bearing 44 is interposed between a top surface of the shaft support 34 and a bottom surface of the carrier 54, whereby the carrier 54 is relatively rotatably supported with respect to the shaft support 34. A needle bearing 45 is interposed between a top surface of the carrier 54 and a bottom surface of the sun gear 51, whereby the sun gear 51 is relatively rotatably supported with respect to the carrier 54.

An inner peripheral surface of the sun gear 51 is spline-fitted on an outer peripheral surface of the shaft portion 12 of the rotor hub 11, whereby rotation of the rotor 10 is transmitted to the sun gear 51. The ring gear 52 includes a horizontally extending flange 52a and a cylindrical side wall 52b rising from a radially inward edge portion of the flange 52a. A gear 52c is formed on an upper end inner peripheral surface of the side wall 52b. On the upper surface of the bottom wall 321 of the lower case 32 radially outward of the shaft support 34, a ring-shaped flange 321b is formed centered on the axis CL1. The flange 52a of the ring gear 52 is fastened to the flange 321b by bolts 30b.

The planetary gears 53 are engaged with the sun gear 51 and the ring gear 52, whereby rotation of the sun gear 51 is transmitted through the planetary gears 53 to the carrier 54.

The carrier 54 has a substantially cylinder-shaped shaft portion 55 centered on the axis CL1. The shaft portion 55 is of smaller diameter than the sun gear 51, and an inner peripheral surface of the shaft portion 55 is spline-fitted on the outer peripheral surface of the first shaft 1 below the needle bearing 43 and above the tapered roller bearing 41, whereby rotation of the carrier 54 is transmitted to the first shaft 1.

A bevel gear 1a of larger diameter than the tapered roller bearing 40 is formed on an upper end portion of the first shaft 1 above the tapered roller bearing 40. Alternatively, the bevel gear 1a can be provided as a separate body from the first shaft 1 and integrally joined to the outer peripheral surface of the first shaft 1 by spline-fitting or the like. A step 1b is provided on the outer peripheral surface of the first shaft 1, whereby the outer peripheral surface of the first shaft 1 is formed in stepped shape and diameter of the outer peripheral surface is reduced below the step 1b. A needle bearing 46 is interposed between a top surface of the plate portion 14 of the rotor hub 11 and a bottom surface of the step 1b, whereby the first shaft 1 is relatively rotatably supported with respect to the rotor hub 11.

As shown in FIG. 1, the second shaft 2 is rotatably supported on the upper case 31 by a pair of left and right tapered roller bearings 61 and 62 installed diagonally left-upward and diagonally right-upward of the bevel gear 1a of the first shaft 1 and by a ball bearing 63 and a roller bearing 64 installed rightward of the tapered roller bearing 62. The second shaft 2 is inserted along inner peripheral surfaces of a bevel gear 65 and a spacer 66, both of substantially cylinder-shape centered on the axis CL2, which are installed between the left and right tapered roller bearings 61 and 62. At the time of the insertion, the inner peripheral surface of the bevel gear 65 is spline-fitted on an outer peripheral surface of the second shaft 2, whereby the second shaft 2 rotates integrally with the bevel gear 65. Rotation of the first shaft 1 is therefore transmitted through the bevel gears 1a and 65 to the second shaft 2. A spur gear 67 is spline-fitted on the outer peripheral surface of the second shaft 2 between the ball bearing 63 and roller bearing 64, whereby the spur gear 67 rotates integrally with the second shaft 2.

The differential 3 includes a differential case 3a and multiple gears housed in the differential case 3a, i.e., a pair of left and right side gears 3b and 3c respectively attached to the pair of left and right drive shafts 4 and 5, and a pair of pinion gears 3d and 3e which engage the side gears 3b and 3c. An input gear 3f fixed on the differential case 3a engages the spur gear 67 fixed to the second shaft 2, whereby torque of the second shaft 2 is transmitted through the spur gear 67 and input gear 3f to the differential case 3a. Therefore, the differential case 3a rotates around the axis CL3, and the drive shafts 4 and 5 are driven.

Thus in the present embodiment, the vehicle drive apparatus 100 is configured with the axis of rotation CL1 of the motor MT oriented in vehicle height direction, whereby overall height of the vehicle drive apparatus can be reduced as compared with a vehicle drive apparatus whose axis of rotation CL1 is oriented horizontally. A large diameter motor required for developing high output can therefore be easily installed in a height-restricted space of a vehicle.

Figure 4A:
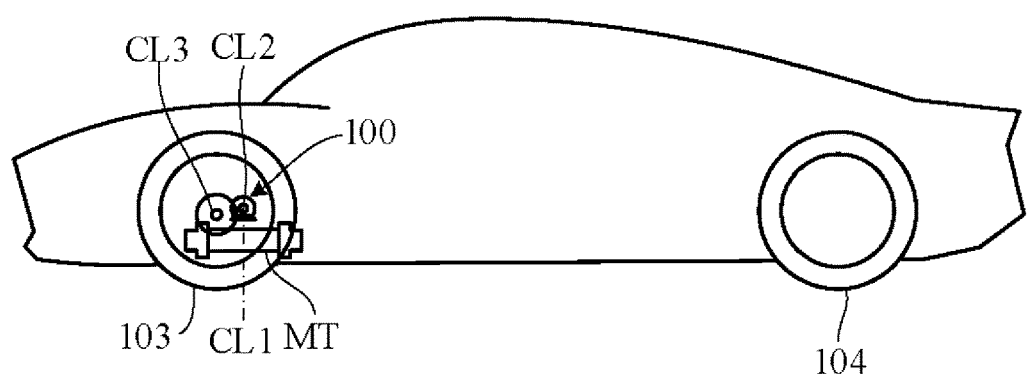
FIG. 4A is a diagram showing a first example of installing the vehicle drive apparatus of FIG. 1 in the vehicle.
Figure 4B:
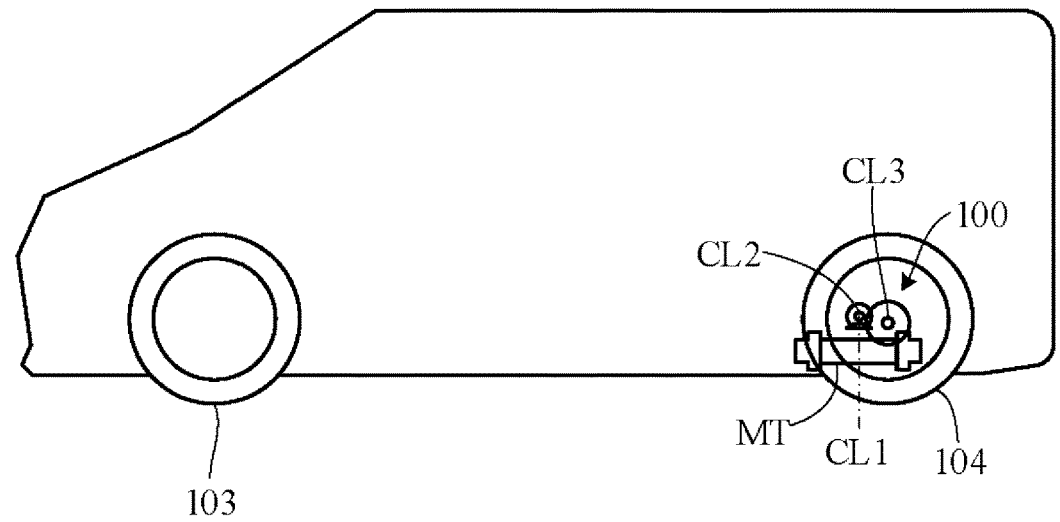
FIG. 4B is a diagram showing a second example of installing the vehicle drive apparatus of FIG. 1 in the vehicle.

FIGS. 4A and 4B are diagrams showing examples of installation of the vehicle drive apparatus 100 in vehicles. FIG. 4A shows an example of installing the vehicle drive apparatus 100 between left and right front wheels 103 for use as a front wheel drive unit. FIG. 4B shows an example of installing the vehicle drive apparatus 100 between left and right rear wheels 104 for use as a rear wheel drive unit. In either example, a top surface of the motor MT is located below the axis of rotation CL3 of the drive wheels 103 or 104. Therefore, when the vehicle drive apparatus 100 is installed in the forward part of the vehicle as shown in FIG. 4A, height of the vehicle hood can be lowered to realize enhanced superiority of design and the like. Further, when the vehicle drive apparatus 100 is installed in the backward part of the vehicle as shown in FIG. 4B, no need arises to raise the floor surface inside the vehicle, so that reduction of vehicle roominess can be avoided.

Figure 5:
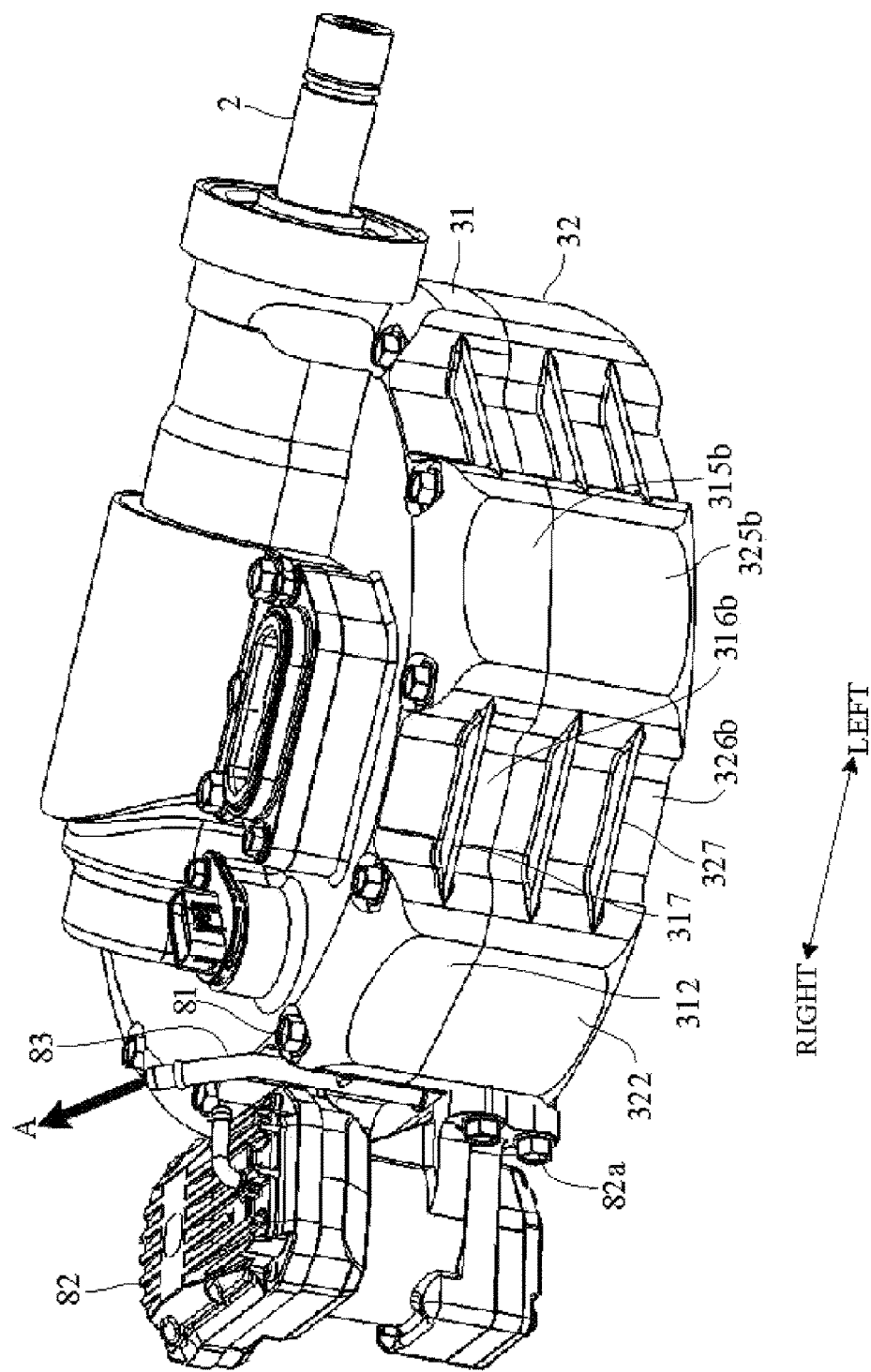
FIG. 5 is a perspective view showing main parts of the vehicle drive apparatus rotated 180° horizontally relative to FIG. 2.

FIG. 5 is a perspective diagram viewing the first drive unit 101 rotated 180° horizontally relative to FIG. 2. As shown in FIG. 5, an oil pump 82 is attached to the side wall 322 of the lower case 32 by bolts 82a. The oil pump 82 is, for example, an electrical trochoidal gear pump. As indicated by arrow "A" in FIG. 5, oil discharged from the oil pump 82 through a pipe 83 is supplied to and cooled by an unshown oil cooler, whereafter, as indicated by arrow B in FIG. 2, it is supplied through a pipe 84 to members of the first drive unit 101 as coolant oil or lubricating oil. For example, coolant oil is supplied to an upper end portion of the winding 23 of the motor MT through an oil passage 31b provided in the upper case 31 as shown in FIG. 3.

Oil in the case 30 supplied to various members that accumulates at the bottom of the case 30 is pumped out by the oil pump 82 and circulated. Therefore, when change in vehicle posture or behavior owing to, for example, vehicle turning, acceleration, uphill or downhill driving, or the like, arises that produces a force (e.g., centrifugal force) that acts on and changes level OL of the oil accumulated at the bottom of the case 30, an immersed oil suction port communicating with the oil pump 82 is apt to emerge from the oil (be exposed), thus causing the oil pump 82 to suck in air, i.e., causing a phenomenon called aeration to occur.

Although aeration can be avoided by, for example, bulging the bottom wall 321 of the case 30 downward to form a reservoir space for constantly holding oil regardless of vehicle turning or other behavior and additionally positioning the suction port to communicate with the reservoir space, such a configuration enlarges the vehicle drive apparatus 100 in height direction. This makes it difficult to install the vehicle drive apparatus 100 in the way illustrated in FIGS. 4A and 4B. The vehicle drive apparatus 100 according to the present embodiment is therefore configured as set out in the following in order to prevent aeration and avoid height enlargement.

Figure 6:
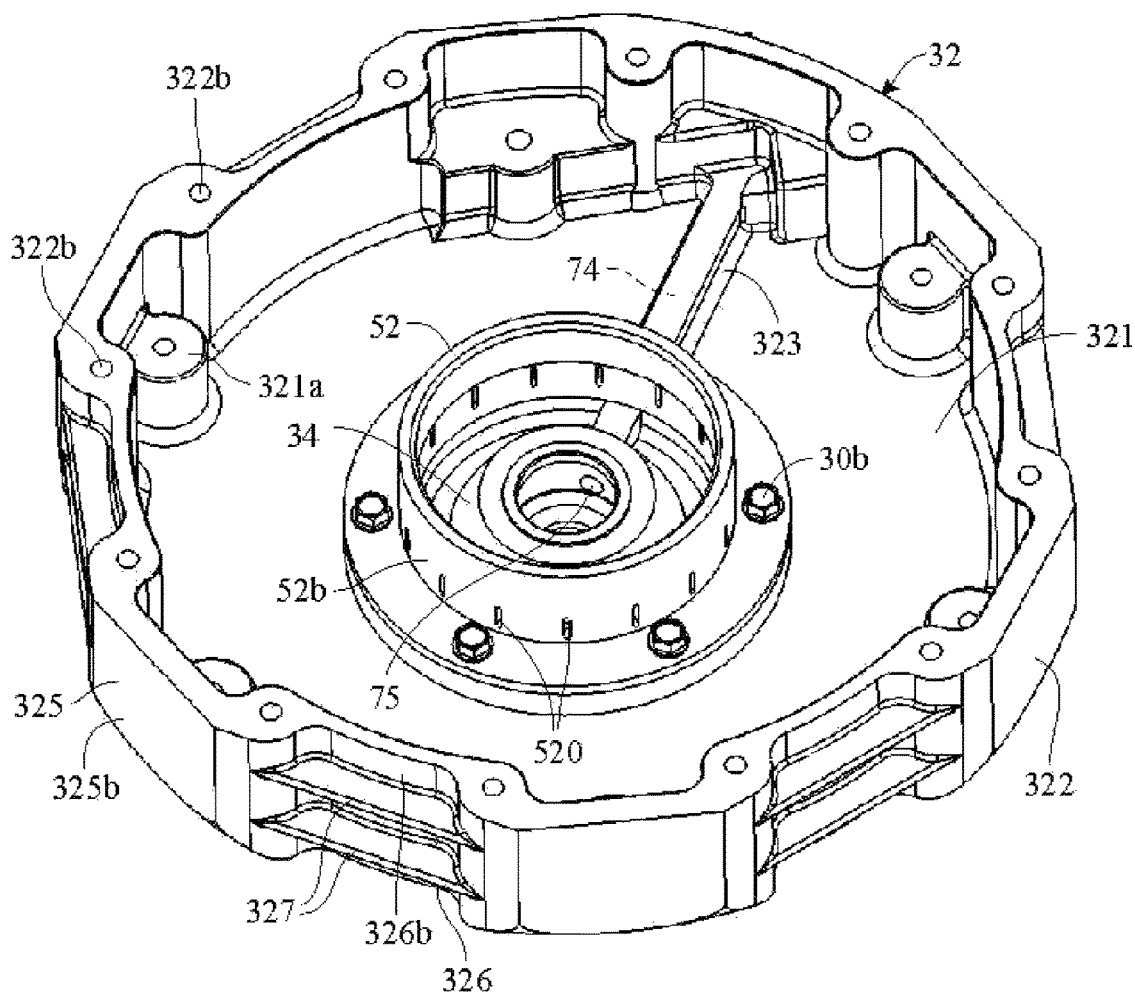
FIG. 6 is a perspective view showing internal configurations of main parts of the vehicle drive apparatus according to the embodiment of the present invention.

FIG. 6 is a perspective view (view from obliquely above) showing main components of the lower case 32 and ring gear 52. As shown in FIGS. 3 and 6, a lower end portion of the side wall 52b of the ring gear 52 is formed circumferentially with multiple circumferentially equispaced through-holes 520 passing horizontally through the side wall 52b of the ring gear 52. As shown in FIG. 3, the shaft support 34 has a sloped portion 34a inclining radially inward and upward from the bottom wall 321. A lower end portion of the sloped portion 34a is formed circumferentially with multiple circumferentially equispaced through-holes 340 passing obliquely downward from its outer peripheral surface to its inner peripheral surface. The through-holes 340 are positioned lower than the through-holes 520.

Figure 7A:
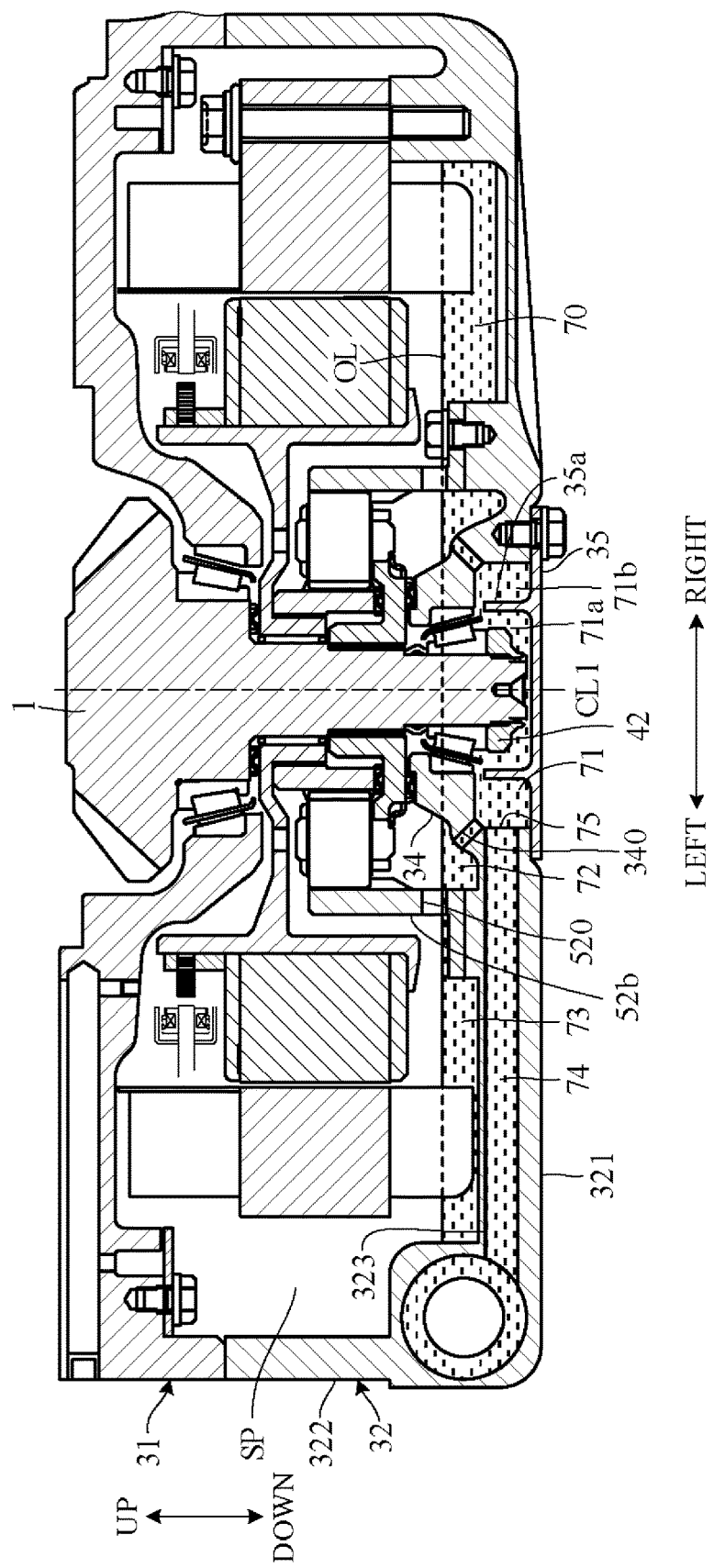
FIG. 7A is a cross-sectional diagram showing main components of the vehicle drive apparatus according to the embodiment of the present invention in a state before oil level changes.
Figure 7B:
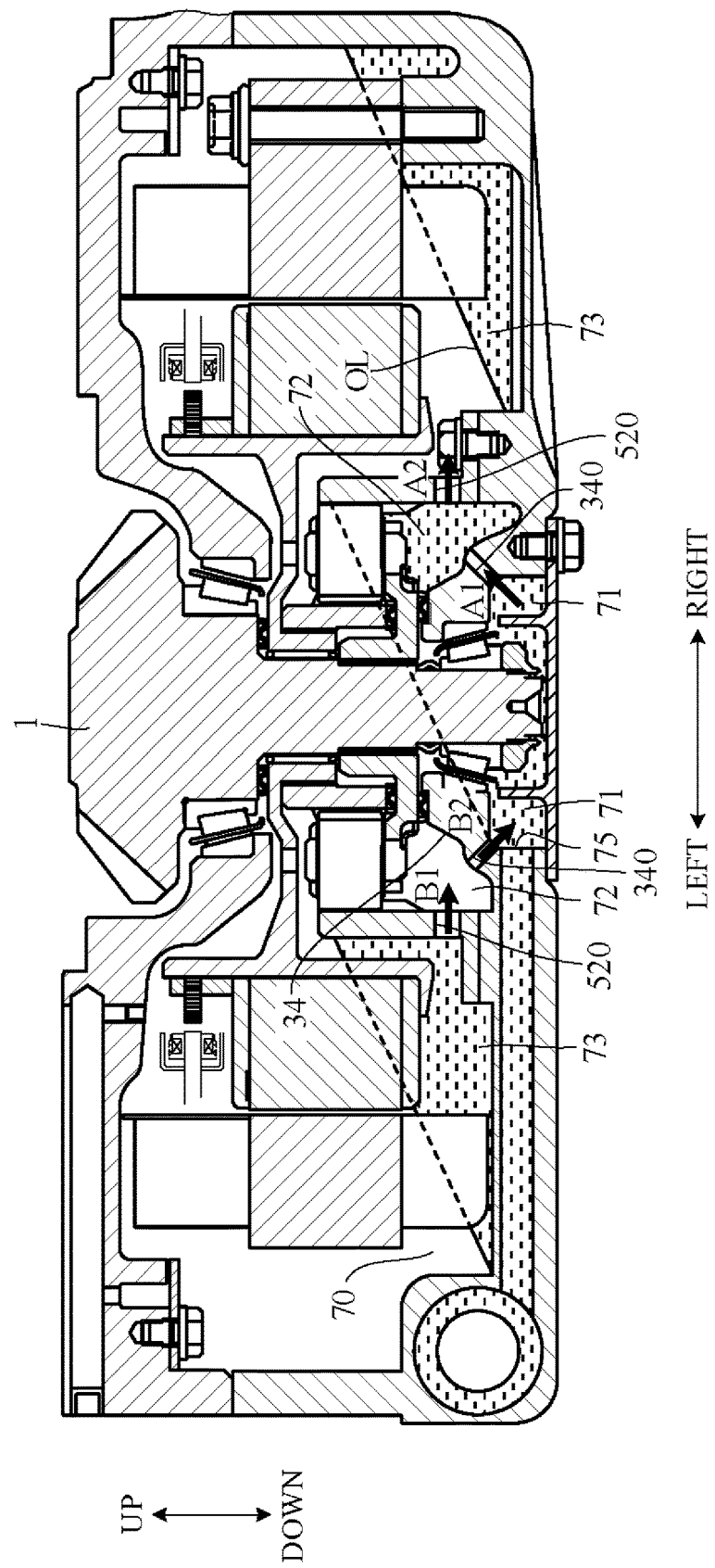
FIG. 7B is a cross-sectional diagram showing main components of the vehicle drive apparatus according to the embodiment of the present invention in a state after oil level has changed.

FIGS. 7A and 7B are diagrams showing positions of oil level OL of oil accumulated in the bottom part of the case 30. FIG. 7A shows oil level OL in a state before changing due to external force, and FIG. 7B shows oil level OL in a state after being shifted owing to vehicle turning or the like.

As shown in FIG. 7A, a reservoir space 70 in which oil supplied from the oil pump 82 accumulates is formed inside (in housing space SP) of the lower case 32 by the bottom wall 321 and the side wall 322. The reservoir space 70 is divided into a substantially circular first reservoir space 71 radially inward of the shaft support 34, a substantially annular second reservoir space 72 between the shaft support 34 and the side wall 52b of the ring gear 52, and a substantially annular third reservoir space 73 radially outward of the side wall 52b. The first reservoir space 71 and second reservoir space 72 communicate through the through-holes 340, and the second reservoir space 72 and third reservoir space 73 communicate through the through-holes 520.

An axis CL1-centered substantially circular plate 35a is erected on an upper surface of the cover 35 attached to the lower surface of the bottom wall 321 of the lower case 32, and the nut 42 on the lower end portion of the first shaft 1 is disposed inward of the plate 35a. The plate 35a functions as a baffle plate, and the first reservoir space 71 is separated by the plate 35a into a radially inward first reservoir space 71a and a radially outward first reservoir space 71b.

As shown in FIG. 6, an upward projecting protrusion (swelling portion) 323 is provided on the upper surface of the bottom wall 321 to extend radially from the central shaft support 34 to the side wall 322 at the peripheral portion of the bottom wall 321. As shown in FIG. 7A, an oil passage 74 is formed inside the protrusion 323. One end of the oil passage 74 communicates with the first reservoir space 71 (radially outward first reservoir space 71b) through an opening 75.

Figure 8:
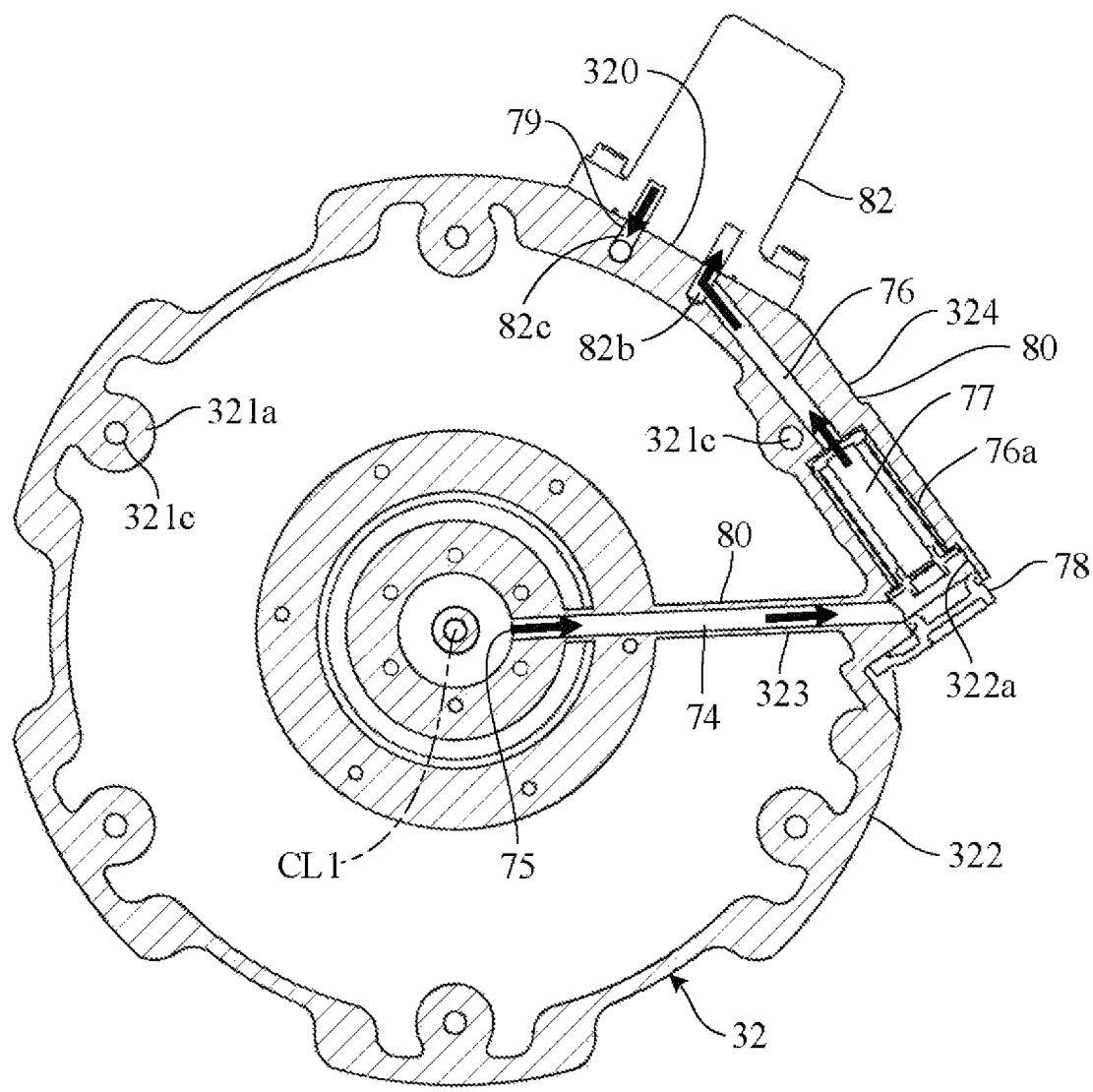
FIG. 8 is a fragmentary cross-sectional diagram sowing a lower case of FIG. 6 taken along a horizontal plane.

FIG. 8 is a fragmentary cross-sectional diagram of the lower case 32 of FIG. 6 taken along a horizontal plane section of the lower case 32 including the oil passage 74. As shown in FIG. 8, a thick portion 324 is thickly formed in radial direction of the side wall 322 of the lower case 32, and an oil passage 76 is formed in the thick portion 324 in circumferential direction of the side wall 322. One end of the oil passage 76 communicates with an end of the oil passage 74, and another end thereof communicates with the oil pump 82. A strainer housing 76a is formed at the one end of the oil passage 76, and a strainer 77 is inserted into the strainer housing 76a through an opening 322a of the side wall 322. The opening 322a is closed by a cap 78.

The flanges 321a (six in the drawing) equispaced around a circle centered on axis CL1 are formed at the side wall 322. Threaded holes 321c for threaded engagement of the through-bolts 30a (FIG. 3) are formed downwardly on the upper surfaces of the flanges 321a. The oil passage 76 is formed to pass radially outward of the threaded holes 321c. The strainer housing 76a is formed between the opening 322a and the threaded holes 321c so as not to interfere with the threaded holes 321c. The protrusion 323 and thick portion 324 constitute an oil passage forming part 80 which forms the oil passages 74 and 76 to extend from the first reservoir space 71 to the oil pump 82.

In the so-configured vehicle drive apparatus 100, the oil pump 82 is driven to suck oil from the first reservoir space 71 (FIG. 7a) through the opening 75, oil passage 74, strainer 77 and oil passage 76 into an oil intake port 82b of the oil pump 82 as indicated by arrows in FIG. 8. The sucked-in oil is discharged from a discharge port 82c of the oil pump 82 to pass progressively through an oil passage 79 formed in the side wall 322 and the pipe 83 (FIG. 5) projecting from the side wall 322.

Should the vehicle turn left at this time, centrifugal force acts on oil accumulated in the reservoir space 70 and causes the oil level OL to tilt as shown in FIG. 7B. Therefore, as indicated by arrows A1 and A2 in FIG. 7B, oil flows from the first reservoir space 71 to the second reservoir space 72 through the through-holes 340 and from the second reservoir space 72 to the third reservoir space 73 through the through-holes 520. Simultaneously, as indicated by arrows B1 and B2, oil flows from the third reservoir space 73 to the second reservoir space 72 through the through-holes 520 and from the second reservoir space 72 to the first reservoir space 71 through the through-holes 340.

As a result, the first reservoir space 71 constantly retains a required amount of oil, thereby preventing emergence (exposure) of the opening 75. The shaft support 34 and side wall 52b of the ring gear 52 particularly function as baffle plates which inhibit outflow of oil from the first reservoir space 71. Therefore, if short-term shifting (tilting) of oil level OL owing to vehicle turning or the like occurs, the opening 75 remains submerged in oil. This prevents aeration from occurring in the oil pump 82.

Figure 9:
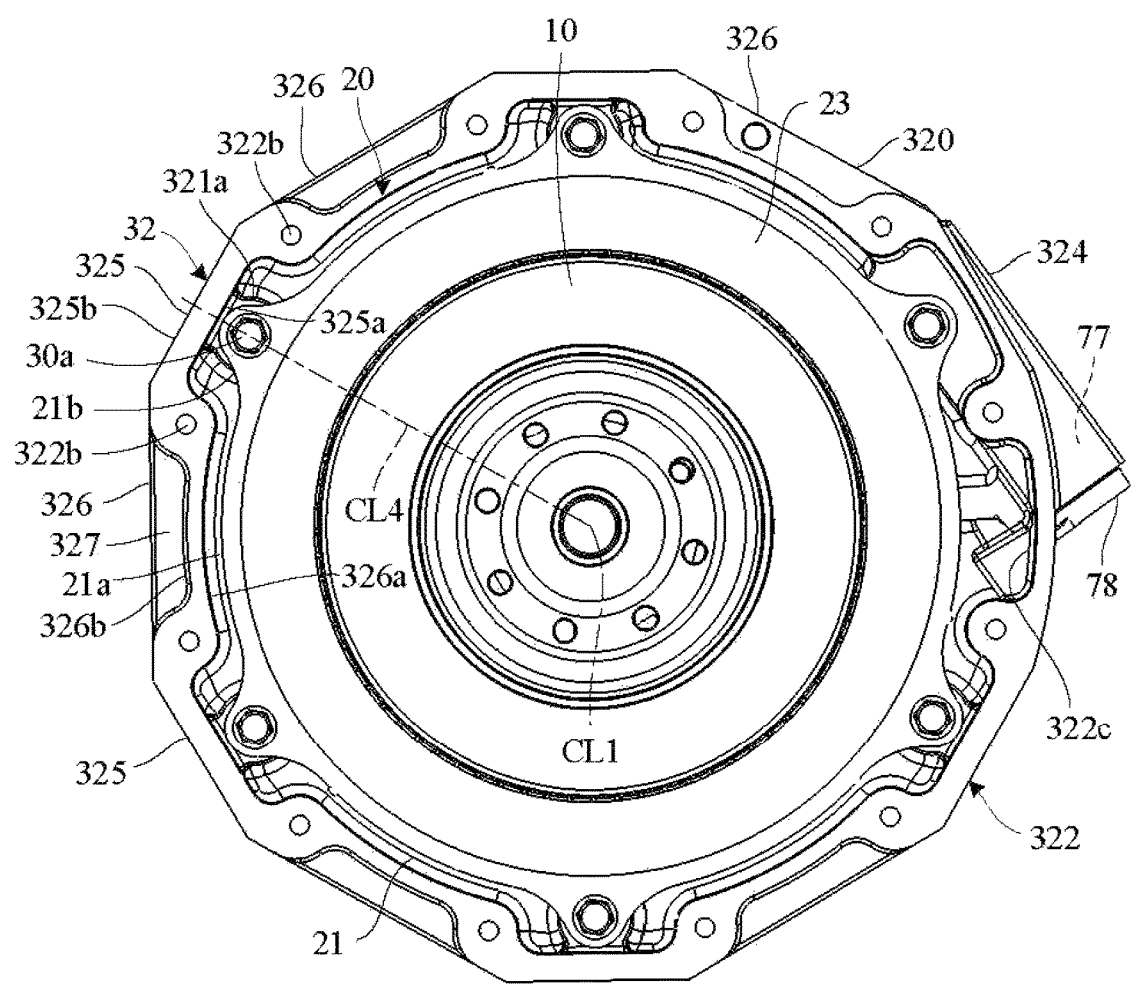
FIG. 9 is a plan view showing main internal configurations of the vehicle drive apparatus according to the embodiment of the present invention.

FIG. 9 is a plan view showing state of the stator 20 assembled with the flanges 321a of the lower case 32. As shown in FIG. 9, an outer peripheral surface of the stator core 21 has arc regions 21a which are parts of a circle centered on axis CL1 and multiple circumferentially equi-spaced flanges 21b (six in the drawing) which protrude radially inward of the arc regions 21a. The side wall 322 of the lower case 32 is of substantially regular dodecagonal shape centered on axis CL1, and has circumferentially alternate first sides 325 and second sides 326. The stator attachment bolts 30a are located on imaginary lines CL4 connecting circumferential centers of the first sides 325 and axis CL1.

Inner peripheral surface of the side wall 322 is, at places other than an attachment region 322c of the cap 78 of the strainer 77, formed in concave-convex shape corresponding to shape of the outer peripheral surface of the stator core 21. In other words, concavities 325a are formed on insides of the first sides 325, and the flanges 321a are formed in the concavities 325a. Convexities 326a protruded radially inward are formed on insides of second sides 326, and the convexities 326a are formed substantially like arcs along the arc regions 21a. The attachment region 322c of the cap 78 of the strainer 77 is formed concave, not as a convexity 326a. Multiple (twelve) circumferentially equispaced threaded holes 322b are formed fully around an upper surface of the side wall 322 at opposite circumferential sides of the individual flanges 321a. The bolts 81 (FIG. 2) are screwed into the threaded holes 322b to join the upper case 31 and the lower case 32. The lower ends of the threaded holes 322b are positioned higher than the strainer 77 to ensure that the cases 31 and 32 can be joined without interfering with the strainer 77.

As shown in FIGS. 6 and 9, an outer peripheral surface of the side wall 322 is formed in a concave-convex shape similar to its inner peripheral surface. In other words, convexities 325b protruded radially outward are formed on the first sides 325 and concavities 326b are formed on the second sides 326. The threaded holes 322b are formed near opposite circumferential ends of the individual convexities 325b. Radiating fins 327 are formed in the concavities 326b to project radially outward. An attachment surface 320 for the oil pump 82 is formed on the second side 326 adjacent to the thick portion 324, and the oil pump 82 is attached to the attachment surface 320 by means of the bolts 82a (FIG. 5).

As shown in FIG. 5, the side wall 312 of the upper case 31 is also formed in a concave-convex shape similar to that of the side wall 322. Specifically, the side wall 312 has concavities 316b above the concavities 326b and convexities 315b above the convexities 325b, and fins 317 are provided in the concavities 316b. As shown in FIG. 9, distance from axis CL1 to radially outer end surfaces of the fins 317 and 327 is equal to or substantially equal to distance from axis CL1 to the convexities 315b and 325b. Therefore, at places other than where the oil pump 82 and strainer 77 are provided (thick portion 324), maximum outer diameter of the case 30 is defined by distance from axis CL1 to first sides 325 and second sides 326.

Figure 10A:
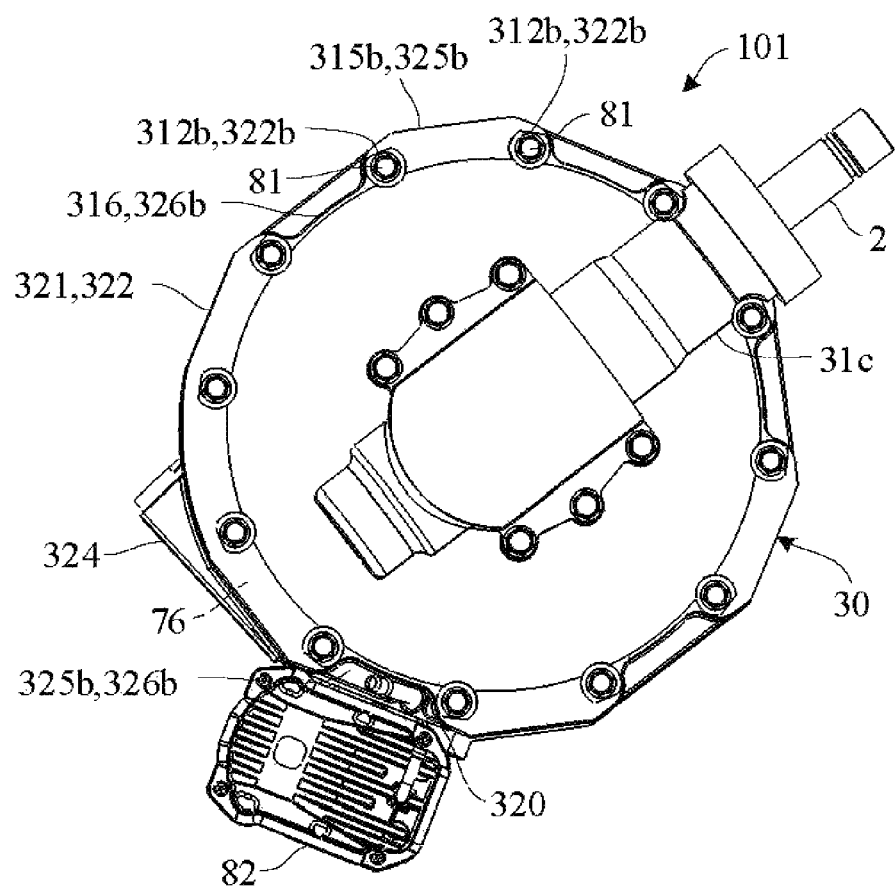
FIG. 10A is a plan view showing an appearance of main parts of the vehicle drive apparatus according to the embodiment of the present invention.
Figure 10B:
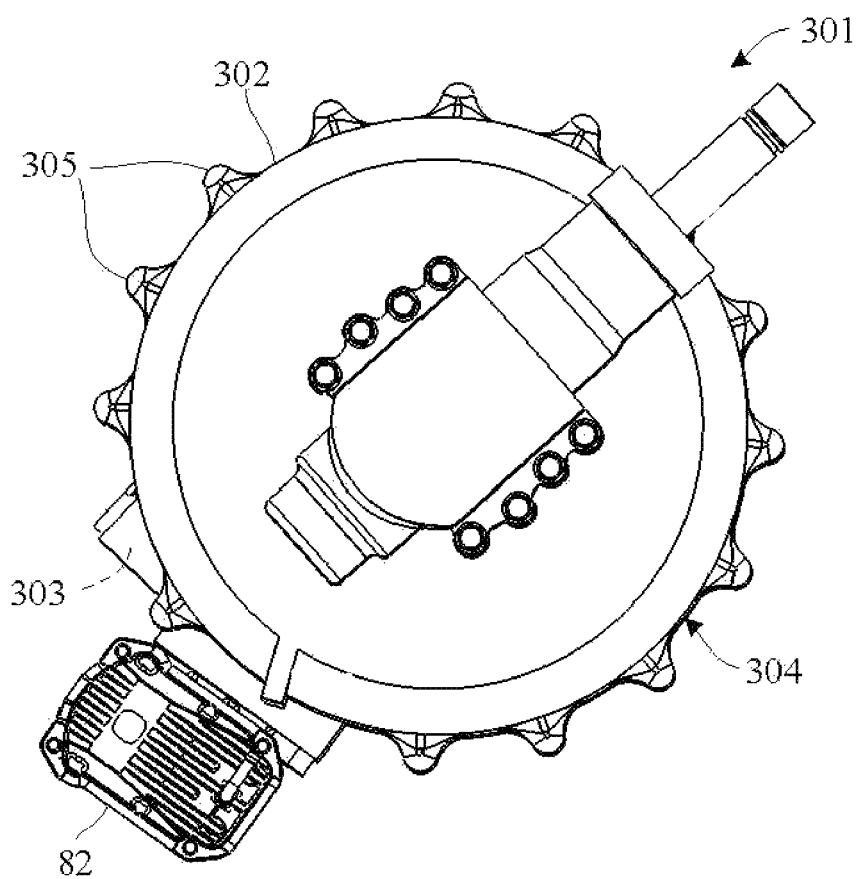
FIG. 10B is a plan view as a comparative example of FIG. 10A.

FIG. 10A is a plan view of the first drive unit 101 and FIG. 10B is a plan view of a first drive unit 301 illustrated as a comparative example thereof. In the present embodiment, as shown in FIG. 10A, the outer peripheral surfaces of the side walls 312 and 322 of the upper case 31 and lower case 32 are formed to have concave-convex shapes, and the upper case 31 and lower case 32 are joined by the bolts 81 passed through through-holes 312b provided near opposite circumferential ends of the individual convexities 315b and screwed into the threaded holes 322b provided near opposite circumferential ends of the individual convexities 325b (FIG. 5). In other words, bolt joints are provided inward of an outer peripheral surface (first sides 325 and second sides 326) of the case 30. Further, the attachment surface 320 for the oil pump 82 is provided on one second side 326 of the side wall 322 of the lower case 32, the adjacent convexity 325b (first side 325) is formed as the thick portion 324, and the oil passage 76 is provided in this thick portion 324 so as to avoid interference with the threaded hole(s) 321c (FIG. 8). As a result, protrusion of the oil pump 82 from the side wall 322 can be minimized to realize a first drive unit 101 which is diametrically compact.

In contrast, since in the comparative example shown in FIG. 10B an outer peripheral surface of a sidewall 302 of the first drive unit 301 is formed circular, bolt joints 305 have to be projected radially outward from an outer peripheral surface of a case 304 in order to avoid interference with an oil passage 303. As a result, protrusion of the oil pump 82 from the sidewall 302 increases, thereby diametrically enlarging the first drive unit 301.

In the present embodiment shown in FIG. 10A, pitch of the bolts 81 (spacing between adjacent bolts 81) in circumferential direction is substantially equal to outer diameter of a cylindrical portion 31c of the upper case 31 which encloses the second shaft 2. Since this enables the bolts 81 to be arrayed at even pitch over the whole circumference, uniform bolt joining force can be applied between the cases 31 and 32 throughout their circumferences.

Figure 11:
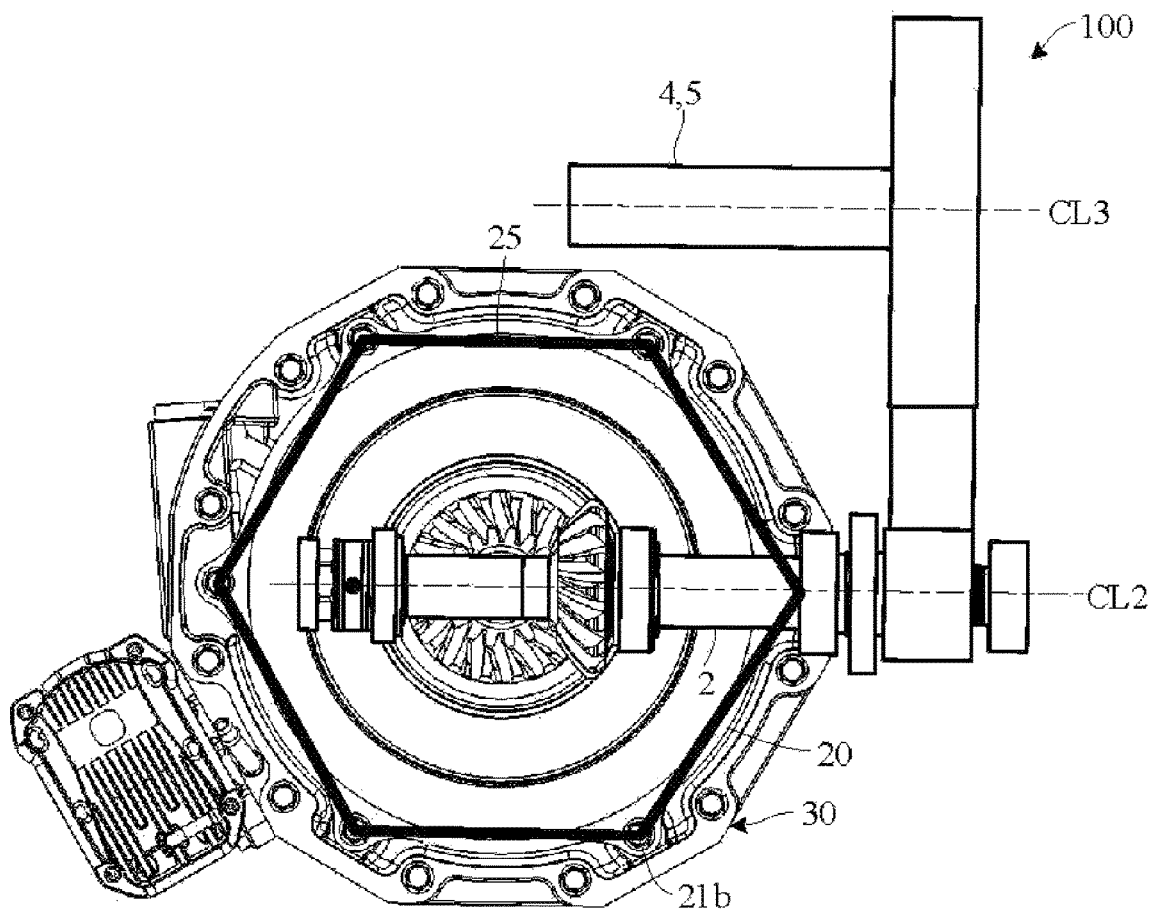
FIG. 11 is a plan view showing main configurations of the vehicle drive apparatus according to the embodiment of the present invention.

FIG. 11 is a plan view showing positional relation between the second shaft 2 and the drive shaft 4 of the vehicle drive apparatus 100. As indicated in FIG. 11 by a thick line sequentially connecting threaded holes of the flanges 21b of the stator core 21, the stator 20 is substantially hexagonal, while the outer peripheral surface of the case 30 is of regular dodecagonal shape. Given this geometry, the second shaft 2 (axis CL2) and drive shaft 4 (axis CL3) are arranged parallel to one side 25 of the hexagon. As a result, height of the vehicle drive apparatus 100 can be minimized, and its horizontal length can also be minimized.

According to the embodiment, the following operations and effects can be achieved.

(1) The vehicle drive apparatus 100 includes: the first shaft 1 extending along the axis CL1 in a vertical direction; the planetary gear mechanism 50 arranged around the first shaft 1 about the axis CL1 to enable transmission of torque to the first shaft 1; the case 30 and cover 35 which accommodate the first shaft 1 and the planetary gear mechanism 50 and which includes the bottom wall 321, side wall 322 and cover 35 to form a reservoir space 70 for accumulating oil supplied from the oil pump 82; the shaft support 34 formed cylindrically and projected upward from the upper surface of the bottom wall 321 to rotatably support the first shaft 1 (FIG. 3). The ring gear 52 of the planetary gear mechanism 50 is arranged around the shaft support 34, and a bottom part of the ring gear 52 is fixed to the upper surface of the bottom wall 321 (FIG. 3). The reservoir space 70 includes the first reservoir space 71 radially inward of the shaft support 34, the second reservoir space 72 between the shaft support 34 and the ring gear 52, and the third reservoir space 73 radially outward of the ring gear 52 (FIG. 7A). The vehicle drive apparatus 100 further includes: the through-holes 340 provided in the shaft support 34 for communicating the first reservoir space 71 and second reservoir space 72; the through-holes 520 provided in the ring gear 52 for communicating the second reservoir space 72 and third reservoir space 73; and the oil passage forming part 80 for forming the oil passages 74 and 76 communicating with the first reservoir space 71 at one end and with the oil pump 82 at the other end (FIGS. 7A and 8).

Owing to this configuration, the first reservoir space 71 can remain filled with an adequate amount of oil regardless of any shift of the oil level OL at the bottom of the case 30 during vehicle turning. Therefore, aeration can be prevented without enlarging the vehicle drive apparatus 100 in height direction, because no need arises to provide an oil reservoir space by bulging the case 30 downward.

(2) The side wall 322 has the attachment surface 320 for attaching the oil pump 82 (FIG. 8). The oil passage forming part 80 has the protrusion 323 for forming the oil passage 74 along the bottom wall 321 from the first reservoir space 71 to the side wall 322 and the thick portion 324 for forming the oil passage 76 along the side wall 322 from an end of the protrusion 323 to the oil pump 82 (FIG. 8). Midway of the oil passage 76, the thick portion 324 has the strainer housing 76a for accommodating the strainer 77 (FIG. 8). This enables efficient formation of a flow path to the oil pump 82 outside the case 30 without enlarging the case 30.

(3) The vehicle drive apparatus 100 further includes the motor MT housed inside the case 30 (FIG. 3). The motor MT has the rotor 10 which rotates centered on axis CL1 and is connected for torque transmission to the planetary gear mechanism 50, and also the stator 20 arranged around the rotor 10 (FIG. 3). Therefore, since the motor MT is arranged in the case 30 to be centered on the vertical axis CL1, oil discharged from the oil pump 82 can be supplied to and cool the motor MT (its winding 23), while achieving minimum height of the motor MT and compact size of the vehicle drive apparatus 100.

(4) The case 30 includes the vertically separable upper case 31 and lower case 32. An outer surface of the side wall 322 is formed in an axis CL1-centered substantially regular dodecagonal shape whose perimeter is formed by the alternate first sides 325 and second sides 326 (FIG. 9). The side wall 322 is provided on radially inward sides of the first sides 325 with the flanges 321a for supporting the stator 20 and near opposite circumferential ends of the first sides 325 with the threaded holes 322b into which the bolts 81 are screwed to fasten the upper case 31 and lower case 32 together (FIG. 9). Owing to this configuration, the case 30 has a symmetrical shape centered on the axis CL1, and since the bolts 81 come to be located inward of the sides 325 and 326 of the case 30, the vehicle drive apparatus 100 can be radially downsized.

(5) The second sides 326 are formed concave radially inward, and the side wall 322 has the radiating fins 327 on the second sides 326, i.e., in the concavities 326*b* (FIG. 6). The fins 327 enhance heat radiating performance of the case 30.

(6) The first shaft 1 has the bevel gear 1*a* fitted on its upper end (FIG. 1). The vehicle drive apparatus 100 further includes the second shaft 2 extending along horizontal axis CL2 and provided with the bevel gear 65 which engages the bevel gear 1*a* (FIG. 1). The flanges 321*a* are individually provided at positions corresponding to vertices of a regular hexagon, and the second shaft 2 extends parallel to one side 25 of the regular hexagon (FIG. 11). This arrangement lowers overall height of the vehicle drive apparatus and also keeps its horizontal length short.

In the aforesaid embodiment, the first shaft 1 having the bevel gear 1*a* extends along the vertical axis CL1, but a rotating shaft is not limited to this configuration. The forgoing description explains that torque of the motor MT is transmitted to the first shaft 1 through the planetary gear mechanism 50 in the aforesaid embodiment, but transmission of torque of the first shaft 1 through the planetary gear mechanism 50 to the motor MT is also possible. In the aforesaid embodiment, the reservoir space 70 for accumulating oil supplied from the oil pump 82 is formed by the case 30 (bottom wall 321 and side wall 322) and the cover 35, but a case member is not limited to this configuration. A side wall portion can be constituted by the pair of upper and lower side walls 312 and 322 instead of solely by the side wall 322. The cover can be structured solely by the bottom wall 321 instead of by the bottom wall 321 and cover 35. Therefore, a configuration of a bottom wall portion is not limited the above configuration. In the aforesaid embodiment, the shaft support 34 rises from the upper surface of the bottom wall 321, but it is possible instead to provide the bottom wall 321 and shaft support 34 separately and unify them using bolts or the like. Therefore, a shaft support member is not limited to the above configuration.

In the aforesaid embodiment, the first reservoir space 71 and second reservoir space 72 are configured to communicate through the through-holes 340 of the shaft support 34, but a first passage is not limited to the aforesaid configuration and the two spaces can instead be configured to communicate not through through-holes but through notches or the like. In the aforesaid embodiment, the second reservoir space 72 and third reservoir space 73 are configured to communicate through the through-holes 520 of the ring gear 52, but a second passage is not limited to the aforesaid configuration and the two spaces can instead be configured to communicate not through through-holes but through notches or the like.

In the aforesaid embodiment, the oil passage forming part 80 is configured by the protrusion 323 (swelling portion) of the bottom wall 321 of the case 30 and the thick portion 324 of the side wall 322 of the case 30, but an oil passage forming part can be of any type insofar as it forms an oil passage so as to communicate with the first reservoir space at one end (first end) thereof and communicate with the oil pump at the other end (second end) thereof. Specifically, the oil passage 74 (first oil passage) along the bottom wall 321 and the oil passage 76 (second oil passage) along the side wall 322 can be formed without providing the protrusion 323 as a first oil passage forming part and the thick portion 324 as a second oil passage forming part. In the aforesaid embodiment, the attachment surface 320 for the oil pump 82 is provided on the side wall 322 of the lower case 32, but a pump attachment portion can be provided at some other location. In the aforesaid embodiment, the strainer housing 76*a* is provided midway of the oil passage 76, but a strainer housing can be provided midway of the first oil passage instead of the second oil passage.

In the aforesaid embodiment, the outer peripheral surface of the case 30 is formed in a regular polygon, specifically in a regular dodecagonal shape, but a case member is not limited to the aforesaid configuration. In the aforesaid embodiment, the flanges 321*a* are provided on the radially inward sides of the first sides 325 of the side wall 322 and the threaded holes 322*b* are provided near the opposite circumferential ends, but stator support portions and bolt attachment portions are not limited to this configuration. In the aforesaid embodiment, the fins 317 and 327 are provided on second sides 326 of the side walls 312 and 322, but radiating fins are not limited to this configuration.

In the configuration of the vehicle drive apparatus 100 according to the aforesaid embodiment, the bevel gear 1*a* (first bevel gear) of the first shaft 1 (first rotating shaft) and the bevel gear 65 (second bevel gear) of the second shaft 2 (second rotating shaft) are engaged, but a vehicle drive apparatus is not limited to this configuration. Namely, the present invention can also be similarly applied to a vehicle drive apparatus not having bevel gears. The present invention can also be similarly applied to transmissions and the like which do not have an electric motor as a dynamoelectric machine in a case. Although the vehicle drive apparatus is used as a drive apparatus for vehicle propulsion in the foregoing, a vehicle drive apparatus of the present invention can also be used as a drive apparatus for other purposes.

The above embodiment can be combined as desired with one or more of the above modifications. The modifications can also be combined with one another.

According to the present invention, aeration in an oil pump can be prevented at the time of shifting of an oil level, without enlarging a vehicle drive apparatus in height direction.

Above, while the present invention has been described with reference to the preferred embodiments thereof, it will be understood, by those skilled in the art, that various changes and modifications may be made thereto without departing from the scope of the appended claims.

What is claimed is:

1. A vehicle drive apparatus, comprising:
   a rotating shaft extending along an axial line in a vertical direction;
   a planetary gear mechanism arranged around the rotating shaft about the axial line so as to enable transmission of a torque to the rotating shaft;
   a case member configured to accommodate the rotating shaft and the planetary gear mechanism, the case member including a first wall portion and a side wall portion to form a reservoir space for accumulating an oil supplied from an oil pump;
   a shaft support member formed cylindrically and projected away from a surface of the first wall portion to rotatably support the rotating shaft, the planetary gear mechanism including a ring gear arranged around the shaft support member so as to surround the shaft support member, the ring gear including a portion fixed to the surface of the first wall portion, the reservoir space including a first reservoir space radially inward of the shaft support member, a second reservoir space between the shaft support member and the ring gear, and a third reservoir space radially outward of the ring gear;
   a first passage provided in the shaft support member to communicate the first reservoir space and the second reservoir space;

a second passage provided in the ring gear to communicate the second reservoir space and the third reservoir space; and an oil passage forming part configured to form an oil passage to communicate with the first reservoir space at a first end of the oil passage and communicate with the oil pump at a second end of the oil passage.

2. The vehicle drive apparatus according to claim 1, wherein the side wall portion includes a pump attachment portion to which the oil pump is attached, and the oil passage forming part includes a first oil passage forming part configured to form a first oil passage along the first wall portion from the first reservoir space to the side wall portion, and a second oil passage forming part configured to form a second oil passage along the side wall portion from an end portion of the first oil passage forming part to the oil pump.

3. The vehicle drive apparatus according to claim 2, wherein the second oil passage forming part includes a strainer housing configured to accommodate a strainer in the second oil passage.

4. The vehicle drive apparatus according to claim 2, wherein the first oil passage forming part includes a swelling portion swelled from the upper surface of the first wall portion, and the first oil passage is formed inside the swelling portion.

5. The vehicle drive apparatus according to claim 1, further comprising a dynamoelectric machine accommodated in the case member, wherein the dynamoelectric machine includes a rotor rotatable about the axial line and a stator arranged around the rotor, and the rotor is connected to the planetary gear mechanism so as to enable transmission of a torque to the planetary gear mechanism.

6. The vehicle drive apparatus according to claim 5, wherein the case member includes a first case and a second case separable with each other, wherein the second case includes the first wall portion and the side wall portion an outer peripheral surface of the side wall portion is formed in a substantially regular polygon about the axial line, and includes first side surfaces and second side surfaces provided alternately in a circumferential direction, and the side wall portion includes stator support portions radially inward of the first side surfaces to support the stator and bolt attachment portions at both ends in the circumferential direction of the first side surfaces to attach bolts for connecting the first case and the second case.

7. The vehicle drive apparatus according to claim 6, wherein the second side surfaces are formed concave radially inward, and the side wall portion includes radiating fins on the second side surfaces.

8. The vehicle drive apparatus according to claim 6, further comprising a second rotating shaft extending along an axial line in a horizontal direction, wherein the rotating shaft is a first rotating shaft including a first bevel gear at an upper end portion thereof, the second rotating shaft includes a second bevel gear engaged with the first bevel gear, the stator support portions are provided at positions corresponding to vertices of a regular hexagon, and the second rotating shaft extends parallel to one side of the regular hexagon.

9. The vehicle drive apparatus according to claim 1, wherein the first passage is configured by a through hole passing obliquely downward from an outer peripheral surface to an inner peripheral surface of the shaft support member.

10. The vehicle drive apparatus according to claim 1, wherein the first wall portion includes a substantially cylindrical plate projected from the surface of the first wall portion inside the shaft support member in a radial direction to partition the first reservoir space into a radially inward first reservoir space and a radially outward first reservoir space.

* * * * *